(12) United States Patent
Hosaka

(10) Patent No.: US 9,081,364 B2
(45) Date of Patent: Jul. 14, 2015

(54) OPTICAL INFORMATION RECORDING/REPRODUCING APPARATUS, OPTICAL INFORMATION RECORDING/REPRODUCING METHOD, AND OPTICAL INFORMATION RECORDING MEDIUM

(71) Applicant: Hitachi Consumer Electronics Co., Ltd., Tokyo (JP)

(72) Inventor: Makoto Hosaka, Fujisawa (JP)

(73) Assignee: HITACHI CONSUMER ELECTRONICS CO., LTD., Tokyo (JP)

(*) Notice: Subject to any disclaimer, the term of this patent is extended or adjusted under 35 U.S.C. 154(b) by 0 days.

(21) Appl. No.: 13/679,421

(22) Filed: Nov. 16, 2012

(65) Prior Publication Data
US 2013/0128327 A1     May 23, 2013

(30) Foreign Application Priority Data
Nov. 18, 2011  (JP) .................................. 2011-252208

(51) Int. Cl.
*G11B 7/00* (2006.01)
*G03H 1/26* (2006.01)
(Continued)

(52) U.S. Cl.
CPC ............. *G03H 1/265* (2013.01); *G03H 1/2286* (2013.01); *G11B 7/083* (2013.01); *G03H 2001/2223* (2013.01); *G11B 7/00781* (2013.01); *G11B 7/08564* (2013.01)

(58) Field of Classification Search
CPC .. G11B 7/00772; G11B 7/0065; G11B 7/083; G11B 2007/240025; G11B 7/24044; G11B 20/0034
See application file for complete search history.

(56) References Cited

U.S. PATENT DOCUMENTS 5,105,416 A * 4/1992 Segawa et al. ................ 369/116
2007/0019267 A1   1/2007 Kogure et al.
(Continued)

FOREIGN PATENT DOCUMENTS

CN     102243878 A    11/2011
JP    2004-272268 A    9/2004
(Continued)

OTHER PUBLICATIONS

Japanese Office Action issued in Japanese Application No. 2011-252208 dated Sep. 16, 2014, w/Partial English translation.
Office Action Chinese Patent Application No. 201210459027.8 dated Feb. 25, 2015.

*Primary Examiner* — Wayne Young
*Assistant Examiner* — Dionne Pendleton
(74) *Attorney, Agent, or Firm* — McDermott Will & Emery LLP

(57) ABSTRACT

In an optical information recording/reproducing apparatus using holography, there are provided the optical information recording/reproducing apparatus, method thereof, and optical information recording medium which correct a zero point and variation of unit quantity of a reference beam angle between apparatus and perform recording or reproducing operation with high compatibility between apparatus. The optical information recording/reproducing apparatus detects a reference beam angle suitable to reproduce angle correction data recorded on the optical information recording medium and corrects a zero point and unit quantity of the reference beam angle at the time of recording or reproducing operation based on the detection angle information.

15 Claims, 10 Drawing Sheets

(51) Int. Cl.
*G03H 1/22* (2006.01)
*G11B 7/08* (2006.01)
*G11B 7/007* (2006.01)
*G11B 7/085* (2006.01)

(56) References Cited

U.S. PATENT DOCUMENTS

| | | |
|---|---|---|
| 2007/0206255 A1 | 9/2007 | Yamakage et al. |
| 2010/0246367 A1* | 9/2010 | Okano et al. ............ 369/103 |
| 2011/0261671 A1 | 10/2011 | Ishii et al. |
| 2011/0280112 A1* | 11/2011 | Nakamura et al. ......... 369/47.49 |
| 2012/0188618 A1* | 7/2012 | Ishii et al. .................. 359/3 |
| 2014/0029404 A1* | 1/2014 | Shimada .................... 369/103 |

FOREIGN PATENT DOCUMENTS

| | | |
|---|---|---|
| JP | 2007-025399 A | 2/2007 |
| JP | 2007-240581 A | 9/2007 |
| JP | 2007-256949 A | 10/2007 |
| JP | 2011-227967 A | 11/2011 |
| WO | WO-2004/102542 A1 | 11/2004 |

\* cited by examiner

OPTICAL INFORMATION RECORDING/REPRODUCING APPARATUS, OPTICAL INFORMATION RECORDING/REPRODUCING METHOD, AND OPTICAL INFORMATION RECORDING MEDIUM

INCORPORATION BY REFERENCE

The present application claims priority from Japanese application JP2011-252208 filed on Nov. 18, 2011, the content of which is hereby incorporated by reference into this application.

BACKGROUND OF INVENTION

The present invention relates to an apparatus, method, and medium which record and/or reproduce information on an optical information recording medium by using holography.

Through a Blu-ray Disc™ specification using a blue-violet semiconductor laser, at present, commercialization of optical disk having recording density of about 100 GB is performed also in consumer use. From now on, large capacity greater than 500 GB is expected also in an optical disk. However, for realizing the above-described ultra-high density by using an optical disk, a high-density technology is needed through a new method which is different from a high-density technology using conventional short wavelength and a high numerical aperture of objective lens.

Research about next-generation storage technology is performed, while a hologram recording technique in which digital information is recorded by using holography gathers attention. As the hologram recording technique, for example, JP-A-2004-272268 is disclosed. In this publication, a so-called angle multiple recording system is disclosed such that different page data is displayed on a spatial light modulator to perform multiple recording while changing an incidence angle to an optical information recording medium of a reference beam. In this publication, a technology is further disclosed such that when a signal beam is focused on a lens and an aperture (spatial filter) is arranged in a beam waist of the signal beam, a distance between adjacent holograms is made to be short.

As the hologram recording technique, for example, WO 2004/102542 is further disclosed. In this publication, an example of using a shift multiplexing system is disclosed. That is, in one spatial light modulator, a light beam emitted from internal pixels is used as a signal beam and a light beam emitted from external annular pixels is used as a reference beam, and both of luminous fluxes are condensed on an optical information recording medium by using the same lens. Near a focal plane of the lens, the signal beam and the reference beam are allowed to interfere with each other, thus recording a hologram.

As a method for adjusting a reproduction laser at the time of reproducing a hologram, for example. JP-A-2007-256949 is disclosed. In this publication, descriptions will be made as follows. That is, "a reference tilt hologram for specifying a reference incidence angle in the radial tilt direction is recorded in advance on a holographic memory medium. During recording and reproducing operations, the reference beam is emitted to a recording position of the reference tilt hologram and the reference incidence angle (reference angle Sr) of the reference beam in the radial tilt direction is detected based on a received light state. A tilt actuator 19 for displacing the holographic memory medium in the radial tilt direction is driven and controlled to adjust an incidence angle of the reference beam in the radial tilt direction to the reference angle Sr. Then, the signal beam and the reference beam are emitted to the holographic memory medium to perform the recording and reproducing operations".

SUMMARY OF THE INVENTION

Incidentally, in an optical information recording/reproducing apparatus using holography, it is important to control an angle of a reference beam at the time of recording and/or reproducing information. A zero point and unit quantity of a reference beam angle vary widely between different apparatus, and therefore it is difficult to perform recording and reproducing operations with high compatibility between apparatus.

In a technology disclosed in JP-A-2007-256949, when a reference beam angle is previously adjusted with reference to a reference hologram, the technology can be adapted to a difference of the zero point of the reference beam angle between disk tilts or apparatus. However, the technology cannot be adapted to deviation of the unit quantity of the reference beam angle between apparatus.

In view of the foregoing, it is an object of the present invention to provide an optical information recording/reproducing apparatus, method thereof, and optical information recording medium which perform recording and reproducing operations with high compatibility.

To solve the foregoing problem, a configuration according to claims is used as one example in the present invention.

Technical Advantage

According to the present invention, an optical information recording/reproducing apparatus performs recording and reproducing operations with high compatibility between apparatus.

Other objects, features and advantages of the invention will become apparent from the following description of the embodiments of the invention taken in conjunction with the accompanying drawings.

DESCRIPTION OF THE EMBODIMENTS

Hereinafter, preferred embodiments of the present invention will be described with reference to the accompanying drawings of the embodiments.

First Embodiment

A first embodiment of the invention will be described with reference to FIGS. 1 to 9.

Figure 2:
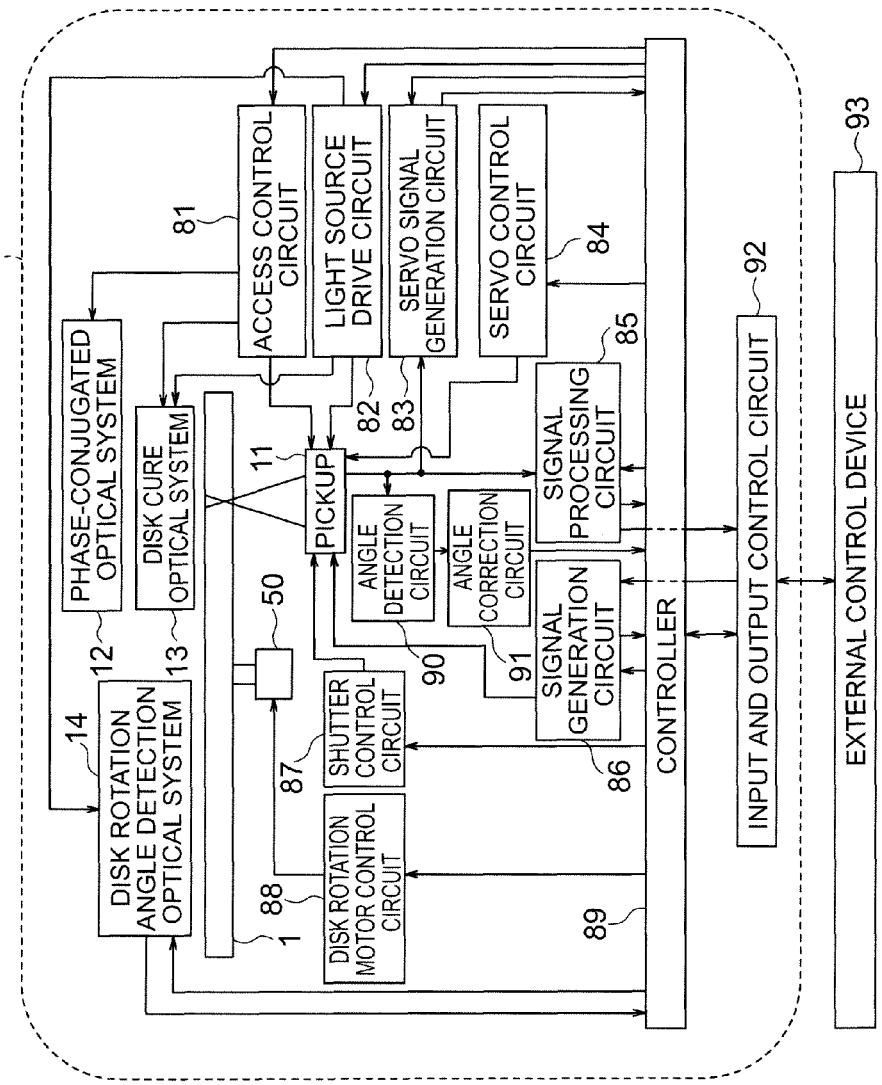
FIG. 2 is a configuration diagram illustrating an embodiment of an optical information recording/reproducing apparatus.

FIG. 2 is a block diagram illustrating a recording/reproducing apparatus including an optical information recording medium which records and/or reproduces digital information by using holography.

An optical information recording/reproducing apparatus 10 is connected to an external control device 93 via an input and output control circuit 92. In the case of performing a recording operation, the optical information recording/reproducing apparatus 10 receives an information signal to be recorded from the external control device 93 via the input and output control circuit 92. In the case of performing a reproducing operation, the apparatus 10 transmits the reproduced information signal to the external control device 93 via the input and output control circuit 92.

The optical information recording/reproducing apparatus 10 includes a pickup 11 a reproduction reference beam optical system 12, a disk cure optical system 13, a disk rotating angle detecting optical system 14, and a rotating motor 50. The optical information recording medium 1 is configured to be rotatable by the rotating motor 50.

The pickup 11 plays a role in emitting a reference beam and a signal beam to the optical information recording medium 1 and recording digital information on a recording medium by using holography. On this occasion, an information signal to be recorded is supplied to a spatial light modulator of the pickup 11 via a signal generation circuit 86 by a controller 89, and the signal beam is modulated by the spatial light modulator.

When reproducing the information recorded in the optical information recording medium 1, a light wave which is made to be incident on the optical information recording medium in a direction opposite to that at the time of recording a reference beam emitted from the pickup 11 is generated by the reproduction reference beam optical system 12. Reproduction light reproduced by a reproduction reference beam is detected by a light detector described later of the pickup 11 and a signal is reproduced by a signal processing circuit 85.

Opening and closing time in a shutter of the pickup 11 is controlled through a shutter control circuit 87 by the controller 89, and through the process, irradiation time of the reference beam and signal beam irradiated on the optical information recording medium 1 can be adjusted.

The disk cure optical system 13 plays a role in generating a light beam for use in a pre-cure process and a post-cure process of the optical information recording medium 1. When information is recorded on a desired position of the optical information recording medium 1, the pre-cure process is a former process in which a predetermined light beam is previously irradiated before irradiating a reference beam and a signal beam on the desired position. The post-cure process is a subsequent process in which after information is recorded on a desired position of the optical information recording medium 1, a predetermined light beam is irradiated so as not to make a record on the desired position.

The disk rotating angle detecting optical system 14 is used to detect a rotating angle of the optical information recording medium 1. When the optical information recording medium 1 is adjusted to a predetermined rotating angle, a signal according to the rotating angle is detected by the system 14. By using the detected signal, the rotating angle of the medium 1 can be controlled through a disk rotating motor control circuit 88 by the controller 89.

From a light source drive circuit 82, predetermined light source drive current is supplied to light sources of the pickup 11, the disk cure optical system 13, and the disk rotating angle detecting optical system 14, thus enabling each light source to emit a light beam with predetermined light intensity.

Also, the pickup 11 and the disk cure optical system 13 each have a mechanism capable of sliding a position in the radial direction of the optical information recording medium 1 with position control undertaken by the access control circuit 81.

Before recording or reproducing information, an angle detection circuit 90 takes in from the pickup 11 a signal obtained by reproducing angle correction data recorded on an angle correction area of the optical information recording medium 1 and a reference beam angle corresponding thereto, and detects a reference beam angle suitable to reproduce the angle correction data, thus supplying it to an angle correction circuit 91. A detailed example of a method for detecting a reference beam angle will be described later.

The angle correction circuit 91 takes from the angle detection circuit 90 a reference beam angle suitable to reproduce the angle correction data, and calculates, based on the reference beam angle and a theoretically-expected reference beam angle, a correction value of a zero point and unit quantity of the reference beam angle, thus supplying it to the controller 89. A detailed example of a method for calculating a correction value of a zero point and unit quantity of the reference beam angle will be described later.

Incidentally, in a recording technology using an angle multiple principle of holography, an allowable margin to deviation of the reference beam angle is inclined to become extremely small.

Accordingly, on the pickup 11, a mechanism in which a deviation amount of the reference beam angle is detected needs to be provided. Further, a servo mechanism for generating a signal for servo control in the signal generation circuit 83 and correcting the deviation amount through a servo control circuit 84 needs to be provided on the optical information recording/reproducing apparatus 10.

In the pickup 11, the disk cure optical system 13, and the disk rotating angle detecting optical system 14, several optical system configurations or all the optical system configurations may be integrated into one configuration for simplicity.

Figure 3:
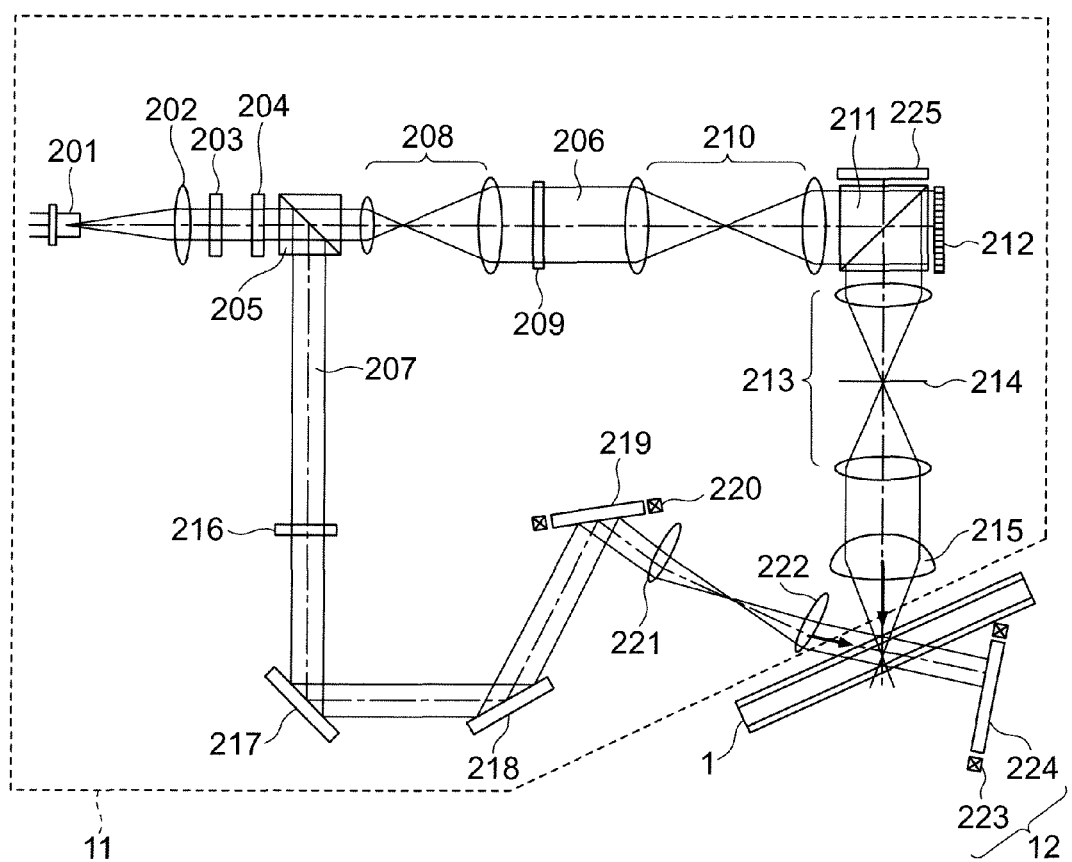
FIG. 3 illustrates an embodiment of a pickup of an optical information recording/reproducing apparatus.

FIG. 3 illustrates a recording principle in one example of a fundamental optical system configuration in the pickup 11 of the optical information recording/reproducing apparatus 10. A light beam emitted from a light source 201 is transmitted through a collimator lens 202 and is incident on a shutter 203. When the shutter 203 is open, a light beam is transmitted through the shutter 203. A polarization direction is then controlled so that a light volume ratio of p-polarization and s-polarization may be a desired ratio through an optical element 204 composed of, for example, a ½ wavelength plate, and then a light beam is incident on a PBS (Polarization Beam Splitter) prism 205.

A light beam transmitted through the PBS prism 205 serves as a signal beam 206, and is expanded in a light beam diameter by a beam expander 208. Then, the light beam is transmitted through a phase mask 209, a relay lens 210, and a PBS prism 211, and is incident on a spatial light modulator 212.

The signal beam to which information is added by the spatial light modulator 212 is reflected by the PBS prism 211 and propagated through a relay lens 213 and a spatial filter 214. Thereafter, the signal beam is collected at the optical information recording medium 1 through an objective lens 215.

On the other hand, the light beam reflected by the PBS prism 205 serves as a reference beam 207, and is set to a predetermined polarization direction depending on whether for recording or reproducing operation by using a polarization direction conversion element 216. The light beam then is incident on a galvanometer mirror 219 through mirrors 217 and 218. Since an angle of the galvanometer mirror 219 is adjustable by an actuator 220, an incidence angle of a reference beam which is incident on the optical information recording medium 1 after transmitted through lenses 221 and 222 can be set to a desired angle. For setting an incidence angle of the reference beam, an element which changes a wave surface of the reference beam may be used in place of the galvanometer mirror.

As described above, on the optical information recording medium 1, the signal beam and the reference beam are made to be incident so as to be overlapped with each other. Through the process, an interference pattern is formed in the optical information recording medium 1, and written in the optical information recording medium 1, thus recording information. In addition, since an incidence angle of the reference beam which is incident on the optical information recording medium 1 can be changed by the galvanometer mirror 219, recording in multiple angles is possible.

Subsequently, in a hologram in which a reference beam angle is changed and recorded on the same area, a hologram corresponding to one reference beam angle is called a page, and a set of angle-multiplexed pages in the same area is called a book.

Figure 4:
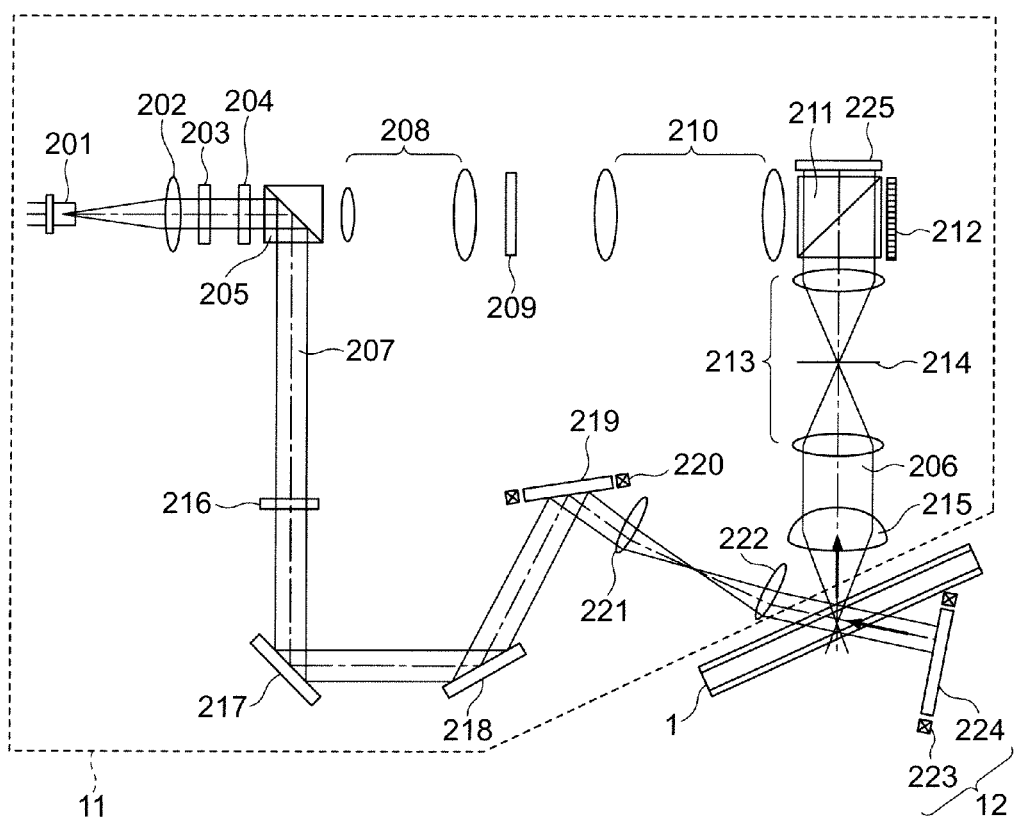
FIG. 4 illustrates an embodiment of a pickup of an optical information recording/reproducing apparatus.

FIG. 4 illustrates a reproduction principle in one example of a fundamental optical system configuration in the pickup 11 of the optical information recording/reproducing apparatus 10. When reproducing the recorded information, the reference beam is made to be incident on the optical information recording medium 1 as described above. The light beam transmitted through the medium 1 is reflected with an actuator 223 by an angle-adjustable galvanometer mirror 224, thereby creating a phase-conjugated wave.

The signal beam reproduced by this phase-conjugated wave is propagated through the objective lens 215, the relay lens 213, and the spatial filter 214. Thereafter, the signal beam is transmitted through the PBS prism 211 and is made to be incident on an optical detector 225, thus reproducing the recorded signals.

Figure 5C:
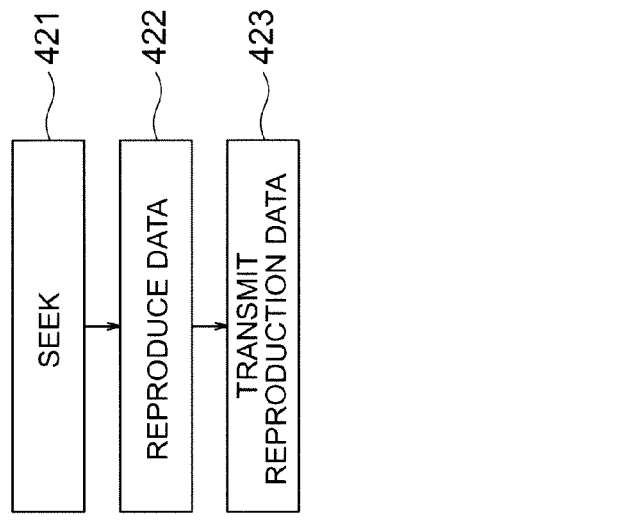
FIGS. 5A to 5C illustrate an embodiment of an operational flow of an optical information recording/reproducing apparatus.
Figure 5B:
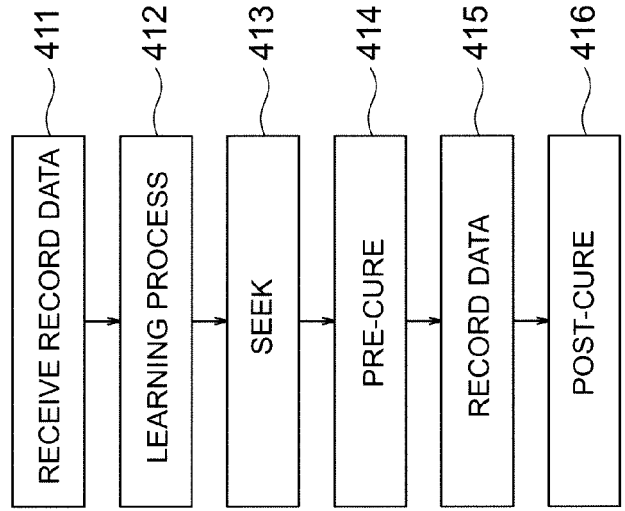
Figure 5A:
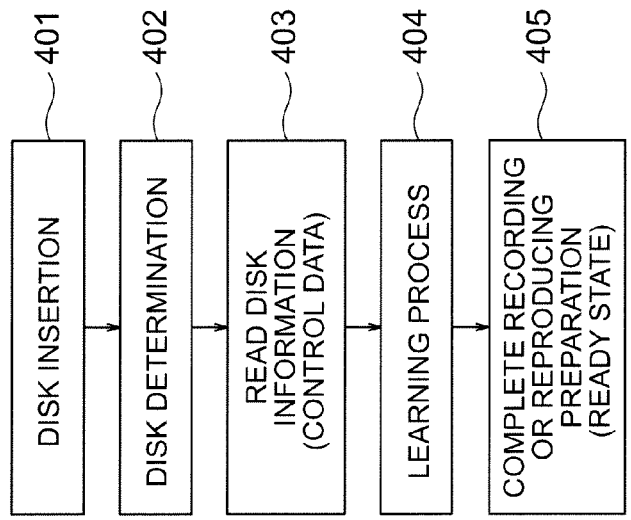

FIGS. 5A to 5C illustrate a flow of recording and reproducing operations in the optical information recording/reproducing apparatus 10. Here, a flow about recording and reproducing operations using holography will be particularly described.

FIG. 5A illustrates an operational flow until recording or reproducing preparation is completed after inserting the optical information recording medium 1 into the optical information recording/reproducing apparatus 10. FIG. 5B illustrates an operational flow until information is recorded on the medium 1 after the preparation completion state. FIG. 5C illustrates an operational flow until the recorded information is reproduced from the medium 1 after the preparation completion state.

When a medium is inserted as illustrated in FIG. 5A (401), the optical information recording/reproducing apparatus 10 performs disk determination, for example, on whether the inserted medium is a medium in which digital information is recorded or reproduced by using holography (402).

As a result of the disk determination, when determining that the medium is an optical information recording medium in which the digital information is recorded or reproduced by using holography, the optical information recording/reproducing apparatus 10 reads out control data provided on the optical information recording medium (403). The apparatus 10 obtains information, for example, about the optical information recording medium and information, for example, about various setting conditions at the time of recording or reproducing operation.

After reading out the control data, the optical information recording/reproducing apparatus 10 performs various adjustments according to the control data and performs a learning process about the pickup 11 (404), and completes recording or reproducing preparation (405).

In the operational flow until information is recorded after the preparation completion state, as illustrated in FIG. 5B, the recorded data is first received (411) and information according to the data is supplied to the spatial light modulator of the pickup 11.

Thereafter, the optical information recording/reproducing apparatus 10 previously performs learning process for various recording of, for example, power optimization of the light source 301 or optimization of exposure time through the shutter 303, if necessary, so as to record high-quality information on the optical information recording medium 1 (412).

Thereafter, in a seek operation (413), the access control circuit 81 is controlled, and the pickup 11 and the disk cure optical system 13 are positioned in a predetermined position of the optical information recording medium 1. When the medium 1 has address information, the optical information recording/reproducing apparatus 10 reproduces the address information and confirms whether it is positioned in an objective position. If the address information is not positioned in an objective position, the apparatus 10 calculates the deviation amount between the present position and a predetermined position and repeats a positioning operation again.

Thereafter, the optical information recording/reproducing apparatus 10 pre-cures a predetermined area by using a light beam emitted from the disk cure optical system 13 (414), and records data by using the reference beam and signal beam emitted from the pickup 11 (415).

After recording the data, the optical information recording/reproducing apparatus 10 performs post-cure by using the light beam emitted from the disk cure optical system 13 (416). Verification of the data may be performed, if necessary.

In an operational flow until the recorded information is reproduced after the preparation completion state, as illustrated in FIG. 5C, the access control circuit 81 is first controlled through a seek operation (421). The pickup 11 and the reproduction reference beam optical system 12 are positioned in a predetermined position of the optical information recording medium 1. When the medium 1 has address information, the optical information recording/reproducing apparatus 10 reproduces the address information and confirms whether it is positioned in an objective position. If the address information is not positioned in an objective position, the apparatus 10 calculates the deviation amount between the present position and a predetermined position and repeats a positioning operation again.

Thereafter, the optical information recording/reproducing apparatus 10 emits reference beam from the pickup 11 and reads out the information recorded in the optical information recording medium (422), thus transmitting the reproduced data (413).

Figure 6:
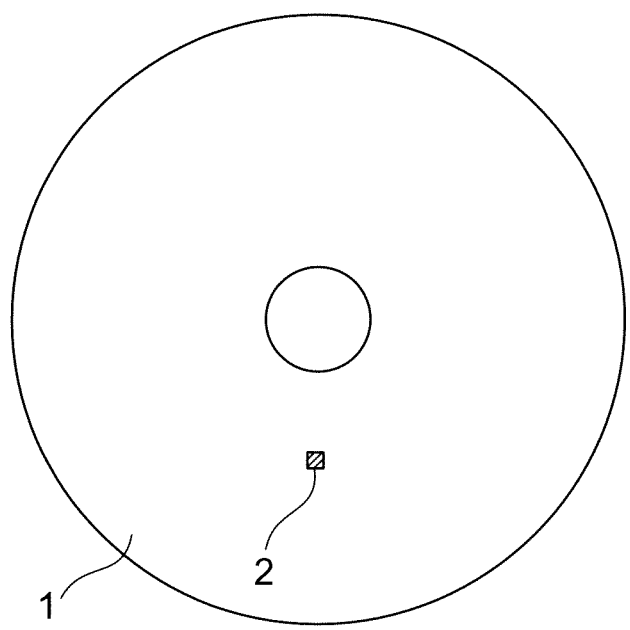
FIG. 6 illustrates an embodiment of an optical information recording medium.

FIG. 6 illustrates an embodiment of the optical information recording medium 1. In the optical information recording medium 1, an angle correction area 2 is present apart from an information recording area. In the angle correction area 2, angle correction data of a predetermined pattern is recorded at a predetermined reference beam angle. Information about these patterns of the angle correction data and information about the angle correction data such as a recording reference beam angle may be kept in the optical information recording medium itself, or in the apparatus, a device which controls the apparatus, or a cartridge which stores the optical information recording medium 1.

In addition, the angle correction data may be previously recorded at the time of shipping the medium, or on the apparatus which first performs a recording operation onto the optical information recording medium 1. Page data included in the angle correction data may have the same pattern as that of a data section, or data may be arranged only in a part in which Bragg selectivity is strongly expressed. As a method for configuring pages with a part in which Bragg selectivity is strongly expressed, for example, there is considered a method for using a page pattern in which an angle between the reference beam and the signal beam preferably becomes large in the medium 1. When a page is configured only by a part in which Bragg selectivity is strongly expressed, a half bandwidth to a reference beam angle of the reproduction light intensity is narrowed, thereby detecting a correct reference beam angle. In FIG. 6, the angle correction area 2 is indicated in a central part of the medium 1; however, is not limited to this position. Further, the angle correction area 2 may be present in an arbitrary position such as an inner peripheral part and an outer peripheral part, or a plurality of the angle correction areas 2 may be prepared. As an advantage that the angle correction areas 2 is arranged in a central part of the medium 1, for example, an influence of expansion and shrinkage or crosstalk from an adjacent recording unit is isotropic, and therefore, a detection error of the reference beam angle due to an influence of disturbances can be suppressed. As an advantage that the angle correction areas 2 is arranged in the inner peripheral part or outer peripheral part of the medium 1, the angle correction data can be arranged in a management area, and therefore, user data is easily distinguished from the angle correction data and a process during the reproducing operation is not complicated.

Figure 7:
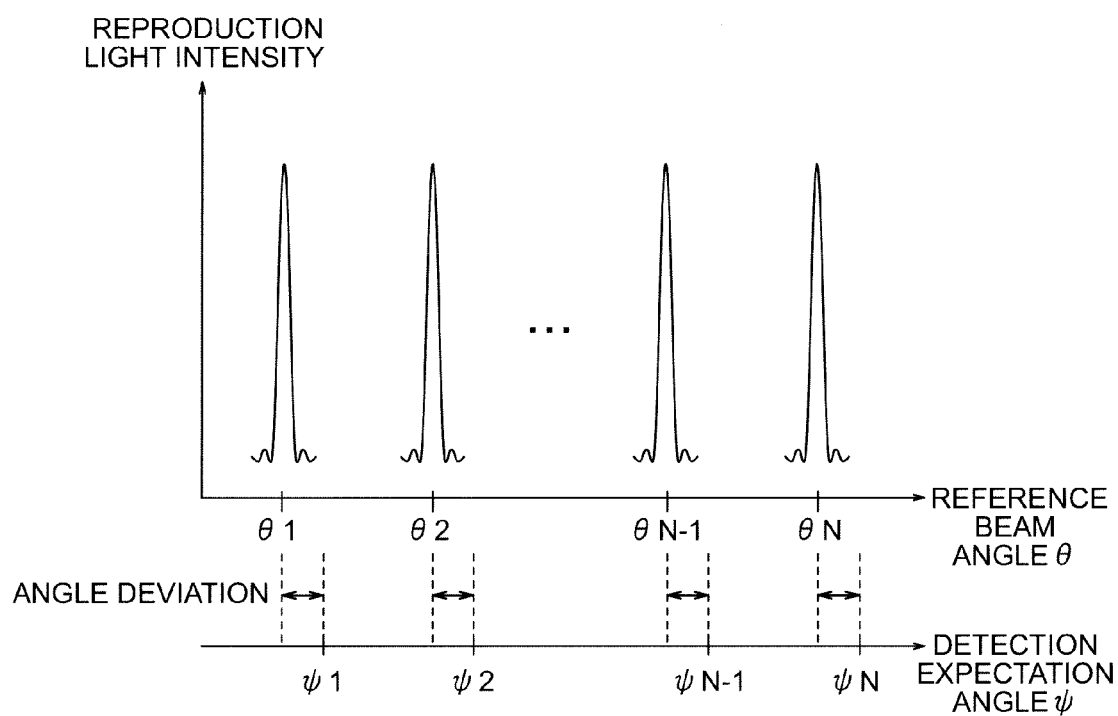
FIG. 7 illustrates an example of a relationship between a reproduction light intensity and a reference beam angle at the time of reproducing angle correction data.

FIG. 7 illustrates an example of a relationship between a reproduction light intensity and a reference beam angle at the time of reproducing angle correction data. When reproducing the angle correction data, the reproduction light intensity is detected, for example, while minutely changing the reference beam angle. At this time, as illustrated in a graph in which the reference beam angle is represented in the horizontal axis and the reproduction light intensity is represented in the longitudinal axis, N pieces of peaks having the same number as the number of recording pages are observed. Reference beam angles $\theta_1$ to $\theta_N$ suitable to reproduce N pages of the angle correction data may be set, for example, to a reference beam angle in which a reproduction light intensity is maximized in each area in which a reference beam angle range is divided into N pieces, or may be set to a reference beam angle in which a reproduction light intensity is greater than a predetermined threshold may be set.

For example, a zero point and unit quantity of the reference beam angle are corrected as follows. The reference beam angles suitable to reproduce N pages of the angle correction data are set to $\theta_1$ to $\theta_N$, and theoretically-expected detection expectation angles are set to $\phi_1$ to $\phi_N$. The detection expectation angle is calculated based on information about the angle correction data stored in a memory provided on an optical information recording medium 1, in a memory provided on a cartridge which stores the medium 1, in a memory of the apparatus, or in a memory of a device which controls the apparatus 10. This detection expectation angle may be set to a reference beam angle at the time of recording, or an influence of a medium shrinkage due to post-cure or that of expansion and shrinkage of the medium due to a temperature change may be considered for calculation. At this time, a correction coefficient $\alpha$ for the unit quantity of the reference beam angle is represented, for example, by the following formula.

$$\alpha = \frac{\sum_{n=1}^{N-1}(\phi_{n+1}-\phi_n)/(\theta_{n+1}-\theta_n)}{N-1} \quad \text{(MATH. 1)}$$

When a record is reproduced, a value of a reference beam angle $\theta$ is multiplied by $\alpha$. On the other hand, a zero point correction value $\Delta\theta$ of the reference beam angle is represented, for example, by the following formula.

$$\Delta\theta = \frac{\sum_{n=1}^{N}(\phi_n-\alpha\theta_n)}{N} \quad \text{(MATH. 2)}$$

A value after correction of the reference beam angle $\theta$ is equal to $\alpha\theta+\Delta\theta$ by using the $\alpha$ and $\Delta\theta$. Here, the $\alpha$ and $\Delta\theta$ are not limited to the above formula, and formula in which the average is not taken may be used, for example, as $\alpha=(\phi_N-\phi_1)/(\theta_N-\theta_1)$ and $\Delta\theta=\phi_{N/2}-\alpha\theta_{N/2}$.

An area is divided into predetermined angle areas and a zero point and unit quantity of the reference beam angle may be corrected. Through the process, an influence of the case where a deviation of the reference beam angle is largely different according to an angle area is considered, thus performing this correction.

On the other hand, when the unit quantity of the reference beam angle need not be corrected, the correction coefficient $\alpha$ is preferably set to one.

Figure 8:
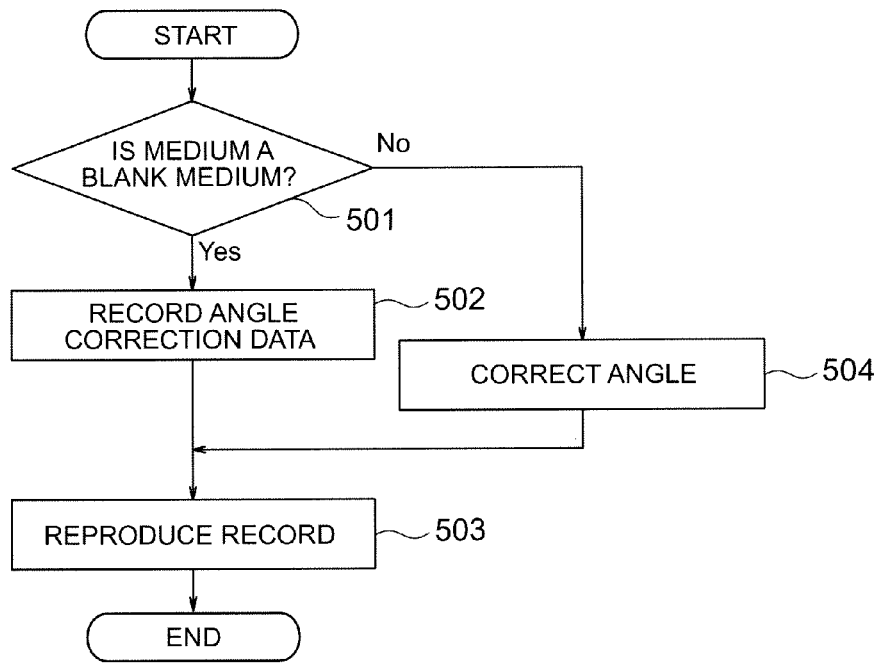
FIG. 8 is a flowchart illustrating an embodiment at the time of mounting a medium on an optical information recording/reproducing apparatus.

FIG. 8 is a flowchart illustrating an embodiment at the time of mounting the optical information recording medium 1 on the optical information recording/reproducing apparatus 10. When the medium 1 is mounted on the apparatus 10, the apparatus 10 first determines at step 501 whether the medium 1 is a blank medium. The apparatus 10 records information about an information record onto the medium, for example, on the medium 1 itself or on a control data area provided on the cartridge which stores the medium for management, and performs the above determination with reference to the control data area at step 501. If so, the apparatus 10 records the angle correction data on the angle correction area of the medium 1 at step 502. Thereafter, the apparatus 10 reproduces records of information at step 503. If not, the apparatus 10 corrects a reference beam angle at step 504 and then reproduces records of information of step 503. When the reference beam angle is corrected, there is needed information about a reproduction light intensity at the time of minutely changing the reference beam angle as illustrated in FIG. 7. For example, while a galvanometer mirror is minutely changed within a scannable range from the low angle side to the high angle side, a reference beam is irradiated on the medium 1. Further, when intensity of the reproduced signal beam is detected by using a light detector, a relationship between the reference beam angle and the reproduction light intensity can be calculated.

Figure 9:
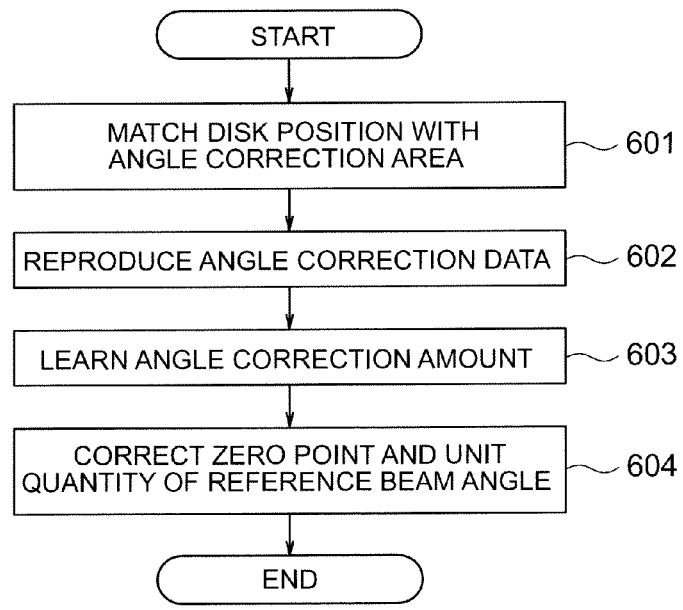
FIG. 9 is a flowchart illustrating an embodiment of operations for correcting a reference beam angle of an optical information recording/reproducing apparatus.

FIG. 9 is a flowchart illustrating an embodiment of operations for correcting a reference beam angle of the optical information recording/reproducing apparatus 10. When the reference beam angle is corrected, a disk position is matched with an angle correction area at step 601. Thereafter, the angle correction data recorded on the optical information recording medium 1 is reproduced at step 602, and the amount of angle correction is learnt at step 603 based on the reproduction data. Finally, a zero point and unit quantity of the reference beam angle are corrected at step 604.

Figure 1:
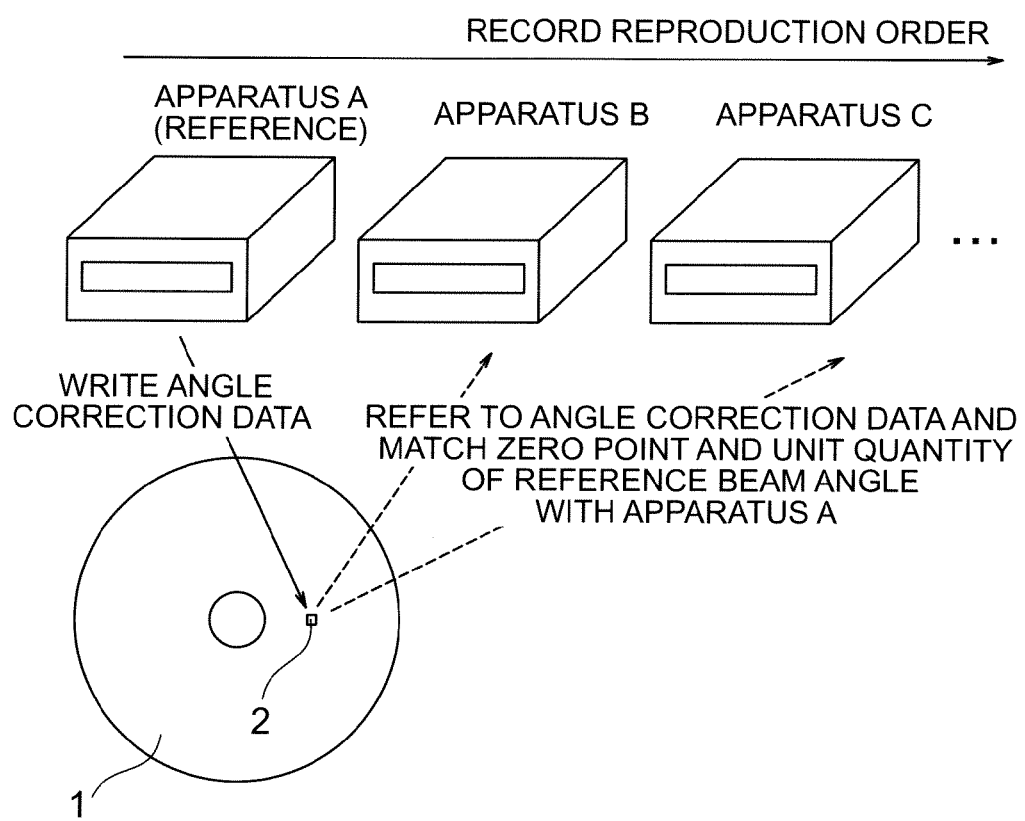
FIG. 1 is a schematic diagram illustrating an outline of the present invention.

FIG. 1 is a schematic diagram illustrating an outline of the present embodiment. On an angle correction area in the optical information recording medium 1, an apparatus A which first performs a recording operation onto the medium 1 records the angle correction data. Thereafter, when the same medium 1 is treated by using another apparatus, the optical information recording/reproducing apparatus 10 first refers to the angle correction data. The zero point and unit quantity of the reference beam angle are first matched with the device A which makes the record, and then the record is reproduced.

For the angle correction data, a white page in which all areas in pages are configured by ON pixels may be used, or a page in which data such as management information and detection expectation angle is changed and created may be used. For an advantage of using a white page, since ON pixels and OFF pixels are arranged without variations, records can be made on the same condition with relation to all pixels in pages. For an advantage of using a page in which data such as the management information and detection expectation angle is changed and created, since information is recorded also on the angle correction area, the waste is small from the viewpoint of recording density.

According to the first embodiment of the invention, when referring to angle correction data recorded on the optical information recording medium, the optical information recording/reproducing apparatus can correct a zero point and unit quantity of a reference beam angle between apparatus and reproduce records with high compatibility between apparatus. In addition, in the present embodiment, an apparatus configuration can be realized by using the nearly same configuration as that of a conventional optical information recording/reproducing apparatus.

Second Embodiment

A second embodiment of the invention will be described with reference to FIGS. 10 and 11. In the present embodiment, when referring to angle correction data of a reference beam, there is used a so-called optical correlation technique in which a light beam to which the angle correction data is added from a signal beam route is made to be incident and the reproduced reference beam is detected. Note that a description of a part common to the foregoing embodiment will not be repeated.

Figure 10:
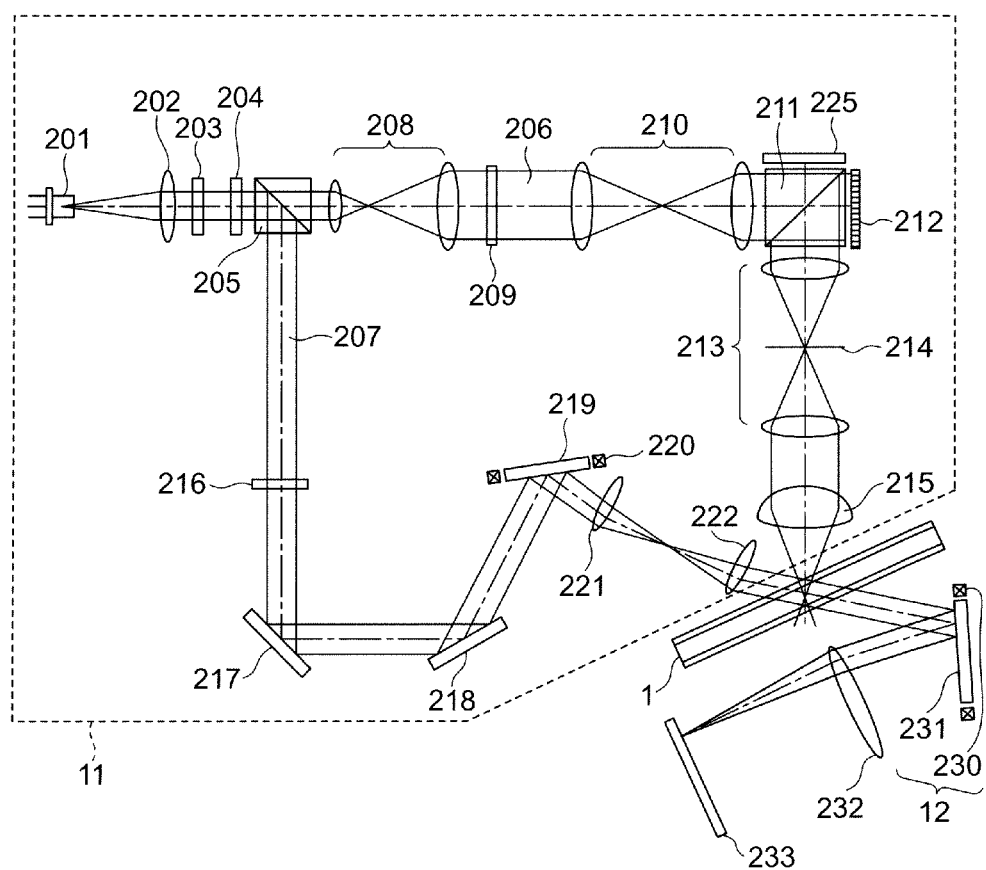
FIG. 10 illustrates an embodiment of a pickup of an optical information recording/reproducing apparatus.

FIG. 10 illustrates an embodiment of a pickup in an optical information recording/reproducing apparatus. In addition to a fundamental optical system configuration of FIG. 3, the present embodiment provides a configuration in which a reference beam diffracted from the optical information recording medium 1 is reflected by a galvanometer mirror 231 and then is made to be incident on a lens 232 to be condensed on a light detector 233.

When searching for a reference beam angle suitable to reproduce the angle correction data, the optical information recording/reproducing apparatus 10 displays a secondary pattern of ON pixels and OFF pixels corresponding to the angle correction data on pixels of the spatial light modulator 212, and irradiates a light beam on the optical information recording medium 1 from an optical path of signal beam, thereby reproducing diffracted light.

Figure 11:
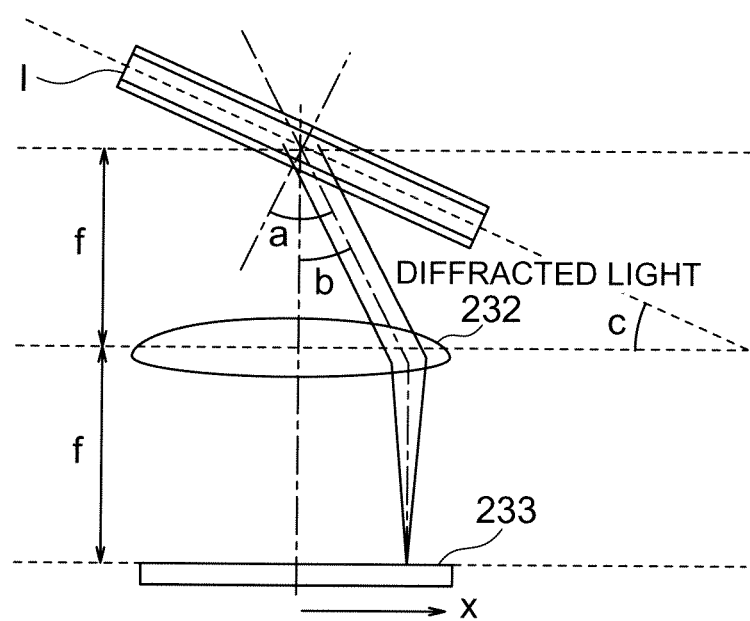
FIG. 11 is a schematic diagram illustrating an example of a relationship between a diffracted light angle and a detection position at the time of searching for a reference beam angle corresponding to angle correction data.

FIG. 11 is a schematic diagram illustrating an example of a relationship between a diffracted light angle and a detection position at the time of searching for the reference beam angle corresponding to the angle correction data. As illustrated in FIG. 11, for example, the lens 232 is disposed on a position of a focal length f of the lens 232 from a hologram of the optical information recording medium 1 as a searching object. The light detector 233 is further disposed on a position of a focal length f so as to be parallel to the lens 232. Suppose that a central position of the light detector 233 is matched with an axis of the lens 232 and an angle between the axis and the diffracted light is set to b. In this case, a position x of a luminescent spot on the light detector is represented, for example, by formula (3).

$$X = f \sin b \quad (3)$$

When an angle between a surface vertical to an optical axis of the lens 232 and a surface vertical to a rotation axis of the optical information recording medium 1 is set to c, a relationship between the foregoing b and an angle a between the rotation axis of the optical information recording medium 1 and the diffracted light is represented, for example, by formula (4)

$$a = b + c \quad (4)$$

Accordingly, when a position x of the luminescent spot is detected by the light detector 233, angle information of the reproduced diffracted light is obtained, and further a reference beam angle optimal for reproduction is calculated based on the above information.

As the light detector 233, here, a light detector capable of two-dimensionally detecting optical information as represented by a CMOS image sensor may be used, or a light detector capable of one-dimensionally detecting optical information as represented by a line sensor may be used. A pixel size of the light detector 233 may be set to a pixel size corresponding to angular resolution necessary to optimally control a reference beam angle. Alternatively, when necessary angle resolution is obtained through calculation of gravity center of the luminescent spot by using position information and luminance information of each pixel of the light detector 233, the pixel size of the tight detector 233 may be set to a pixel size greater than the above pixel size. When the focal length of the lens 232 is made to be long and a system is set to an expansion system, if necessary, resolution for detecting angle information may be improved.

According to the second embodiment of the invention, when referring to angle correction data recorded on the optical information recording medium, the optical information recording/reproducing apparatus can correct a zero point and unit quantity of a reference beam angle between apparatus and reproduce records with high compatibility between apparatus. In addition, in the present embodiment, when referring to the angle correction data, since a reference beam angle need not be minutely scanned, the optical information recording/reproducing apparatus can perform fast correction.

In addition, the present invention is not limited to the above described embodiments, but includes various modifications. For example, the above-described embodiments are described in detail in order to clearly describe the present invention, and are not necessarily limited to the optical information recording/reproducing apparatus having all the described constructions. Further, a part of constructions according to one embodiment can be replaced by those according to other embodiments, and the constructions according to other embodiments can be added to that according to one embodiment. Further, an addition, deletion, or replacement of the constructions according to other embodiments can be performed by using a part of the constructions according to each embodiment.

A part or all of the respective structures, functions, processing units, and processing approaches may be realized by hardware by designing through the integrated circuit, for example. Those structures, functions and the like may be realized by software by interpreting and executing the program for realizing the respective functions through a processor. Information with respect to the program, table, and file for realizing the respective functions may be stored in the recording unit such as the memory, hard disk, and SSD (Solid State Drive), or the recording medium such as the IC card, SD card, and DVD.

The examples show the control line and information line considered as necessary for the explanation, which does not necessarily show all the control lines and information lines of the product. Actually, almost all the components may be considered to be connected with one another.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical information recording/reproducing apparatus to record and/or reproduce information on an optical information recording medium by using holography, the apparatus comprising:
an angle detection unit which detects first angle information including a reference beam angle suitable to reproduce each of a plurality of angle correction data multiply-recorded on the optical information recording medium; and
an angle correction unit which corrects a reference beam angle at the time of recording or reproducing operation based on the first angle information detected by the angle detection unit and second angle information including a reference beam angle at the time of recording each of the plurality of the angle correction data, wherein:
when a reference beam angle suitable to reproduce an n-th-recorded angle correction data from a plurality of reference beam angles included in the first angle information is defined as $\theta_n$, and an reference beam angle at a time of recording the n-th-recorded angle correction data included in the second angle information is defined as $\phi_n$, and
the angle correction unit corrects the reference beam angle at the time of recording and reproducing operation by using $$\frac{\sum_{n=1}^{N}(\varphi_n - \alpha\theta_n)}{N}$$

where $\alpha$ is a coefficient including 1, and N is integer not less than 2.

2. The optical information recording/reproducing apparatus according to claim 1, wherein the angle detection unit detects the angle correction data while changing a reference beam angle, and sets a reference beam angle at the time when the detected reproduction light intensity is substantially maximized to a reference beam angle suitable to reproduce the angle correction data.

3. The optical information recording/reproducing apparatus according to claim 1, wherein the angle detection unit irradiates a light beam to which the angle correction data is added from an optical path of a signal beam at the time of recording operation, detects diffracted light by a light detector, and calculates a reference beam angle suitable to reproduce angle correction data based on position information of the diffracted light on the light detector.

4. The optical information recording/reproducing apparatus according to claim 1, wherein the presence or absence of an information record onto an angle correction data area in the optical information recording medium is recorded on the optical information recording medium or a control data area for recording information about the optical information recording medium in a cartridge which stores the optical information recording medium.

5. The optical information recording/reproducing apparatus according to claim 1, wherein the angle correction data is recorded by an optical information recording/reproducing apparatus which first performs a recording operation on the optical information recording medium.

6. The optical information recording/reproducing apparatus according to claim 1, wherein the angle correction data is previously stored in the optical information recording medium at the time of shipment from a factory.

7. The optical information recording/reproducing apparatus according to claim 1, wherein:
when a reference beam angle suitable to reproduce L-th-recorded angle correction data included in the first angle information is defined as $\theta_L$, and a reference beam angle suitable to reproduce M-th-recorded angle data included in the first angle information is defined as $\theta_M$,
a reference beam angle at a time of recording the L-th-recorded angle correction data included in the second angle information is defined as $\phi_L$, and a reference beam angle at a time of recording the M-th-recorded angle correction data included in the second angle information is defined as $\phi_M$, where L and M are integer, and $1 \le L$, $1 \le M$ and $L \ne M$,
the $\alpha$ is calculated by using a ratio of $(\theta_M - \theta_L)$ and $(\phi_M - \phi_L)$, and
the angle correction unit corrects the reference beam angle at the time of recording and reproducing operation by using the calculated $\alpha$.

8. An optical information recording/reproducing method for recording and/or reproducing information on an optical information recording medium by using holography, the method comprising:
an angle detection step of detecting first angle information including a reference beam angle suitable to reproduce each of a plurality of angle correction data multiply-recorded on the optical information recording medium; and an angle correction step of correcting a reference beam angle at the time of recording or reproducing operation based on the first angle information detected through the angle detection step and second angle information including a reference beam angle at the time of recording each of the plurality of the angle correction data, wherein:

when a reference beam angle suitable to reproduce n-th-recorded angle correction data from a plurality of reference beam angles included in the first angle information is defined as $\theta_n$, and an reference beam angle at a time of recording the n-th-recorded angle correction data included in the second angle information is defined as $\phi_n$, and the reference beam angle at the time of recording and reproducing operation is corrected by using $$\frac{\sum_{n=1}^{N}(\varphi_n - \alpha\theta_n)}{N}$$

Where $\alpha$ is a coefficient including 1, and N is integer not less than 2.

9. The optical information recording/reproducing method according to claim 8, wherein at the angle detection step, the angle correction data is detected while changing a reference beam angle, and a reference beam angle at the time when the detected reproduction light intensity is substantially maximized is set to a reference beam angle suitable to reproduce the angle correction data.

10. The optical information recording/reproducing method according to claim 8, wherein at the angle detection step, a light beam to which the angle correction data is added is irradiated from an optical path of a signal beam at the time of recording operation, diffracted light is detected through an optical detection step, and a reference beam angle suitable to reproduce the angle correction data is calculated based on information about a detection position of the diffracted light at the optical detection step.

11. The optical information recording/reproducing method according to claim 8, wherein the presence or absence of information record onto an angle correction data area in the optical information recording medium is recorded on the optical information recording medium or a control data area for recording information about the optical information recording medium in a cartridge which stores the optical information recording medium.

12. The optical information recording/reproducing method according to claim 8, wherein the angle correction data is recorded by an optical information recording/reproducing apparatus which first performs a recording operation on the optical information recording medium.

13. The optical information recording/reproducing method according to claim 8, wherein the angle correction data is previously stored in the optical information recording medium at the time of shipment from a factory.

14. The optical information recording/reproducing method according to claim 8, wherein:

when a reference beam angle suitable to reproduce L-th-recorded angle correction data included in the first angle information is defined as $\theta_L$, and a reference beam angle suitable to reproduce M-th-recorded angle correction data included in the first angle information is defined as $\theta_M$, and a reference beam angle at a time of recording the L-th-recorded angle correction data included in the second angle information is defined as $\phi_L$, and a reference beam angle at a time of recording the M-th-recorded angle correction data included in the second angle information is defined as $\phi_M$, where L and M are integer, and 1≤L, 1≤M and L≠M, the $\alpha$ is calculated by using a ratio of $(\theta_M-\theta_L)$ and $(\phi_M-\phi_L)$, and the reference beam angle at the time of recording and reproducing operation is corrected by using the calculated $\alpha$.

15. An optical information recording/reproducing apparatus to record and/or reproduce information on an optical information recording medium by using holography, the apparatus comprising:

an angle detection unit which detects first angle information including a reference beam angle suitable to reproduce, by the optical information recording/reproducing apparatus, each of a plurality of angle correction data multiply-recorded, by an optical information recording apparatus different from the optical information recording/reproducing apparatus, on the optical information recording medium; and an angle correction unit which corrects a reference beam angle at the time of recording or reproducing operation based on the first angle information detected by the angle detection unit and second angle information including a reference beam angle at the time of recording each of the plurality of the angle correction data, wherein:

when reference beam angles suitable to reproduce n-th-recorded and m-th-recorded angle correction data from a plurality of reference beam angles included in the first angle information is defined as $\theta_n$ and $\theta_m$, respectively, and reference beam angles at times of recording the n-th-recorded and m-th-recorded angle correction data included in the second angle information is defined as $\phi_n$ and $\phi_m$, respectively, where n and m are integer, and 1≤n, 1≤m, and n≠m, and the angle correction unit calculates a coefficient $\alpha$, where $\alpha$ is a coefficient including 1, by using a ratio of $(\theta_n-\theta_m)$ and $(\phi_n-\phi_m)$, and multiplies by $\alpha$ and corrects the reference beam angle at the time of recording or reproducing operation.

* * * * *